US010681702B2

(12) United States Patent
Yang et al.

(10) Patent No.: US 10,681,702 B2
(45) Date of Patent: Jun. 9, 2020

(54) COMMUNICATION METHOD AND DEVICE

(71) Applicant: Huawei Technologies Co., Ltd., Shenzhen (CN)

(72) Inventors: Li Yang, Shanghai (CN); Hongzhuo Zhang, Shanghai (CN); Kaijie Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 15/789,559

(22) Filed: Oct. 20, 2017

(65) Prior Publication Data

US 2018/0042002 A1 Feb. 8, 2018

Related U.S. Application Data

(63) Continuation of application No. PCT/CN2015/077239, filed on Apr. 22, 2015.

(51) Int. Cl.
*H04W 72/04* (2009.01)
*H04W 88/06* (2009.01)
*H04W 48/02* (2009.01)
*H04W 36/14* (2009.01)
*H04W 72/02* (2009.01)
*H04W 84/12* (2009.01)
*H04W 84/18* (2009.01)

(52) U.S. Cl.
CPC ......... *H04W 72/048* (2013.01); *H04W 36/14* (2013.01); *H04W 48/02* (2013.01); *H04W 88/06* (2013.01); *H04W 72/02* (2013.01); *H04W 84/12* (2013.01); *H04W 84/18* (2013.01)

(58) Field of Classification Search
CPC ... H04W 72/048; H04W 88/06; H04W 48/02; H04W 36/14
See application file for complete search history.

(56) References Cited

U.S. PATENT DOCUMENTS

| 2006/0111108 | A1* | 5/2006 | Newbury | H04W 36/04 455/436 |
| 2008/0318574 | A1* | 12/2008 | Bi | H04W 36/0061 455/436 |
| 2010/0113024 | A1* | 5/2010 | Wu | H04W 36/14 455/436 |
| 2011/0082940 | A1* | 4/2011 | Montemurro | H04L 69/24 709/227 |

(Continued)

FOREIGN PATENT DOCUMENTS

| CN | 101309442 A | 11/2008 |
| CN | 101505524 A | 8/2009 |

(Continued)

*Primary Examiner* — Walli Z Butt
*Assistant Examiner* — Ryan C Kavleski
(74) *Attorney, Agent, or Firm* — Slater Matsil, LLP

(57) ABSTRACT

Embodiments of the present invention provide a communication method and a device. A network controller receives a first message sent by a first access network device, where the first message is used to request the network controller to configure at least one access network device for first user equipment, to implement data transmission or reception between the first user equipment and the at least one access network device; the network controller configures a second access network device for the first user equipment.

20 Claims, 5 Drawing Sheets

(56) References Cited

U.S. PATENT DOCUMENTS

| | | |
|---|---|---|
| 2011/0206003 A1 | 8/2011 | Wu |
| 2012/0083277 A1 | 4/2012 | Ishii et al. |
| 2012/0264449 A1 | 10/2012 | Kazmi et al. |
| 2013/0016696 A1* | 1/2013 | Adjakple .............. H04W 36/28 370/331 |
| 2013/0095835 A1* | 4/2013 | Carmon ............ H04W 36/0083 455/437 |
| 2014/0128092 A1 | 5/2014 | Xiong et al. |
| 2014/0355566 A1 | 12/2014 | Walley et al. |
| 2015/0029973 A1 | 1/2015 | Vesterinen et al. |

FOREIGN PATENT DOCUMENTS

| | | |
|---|---|---|
| CN | 102196389 A | 9/2011 |
| CN | 102196532 A | 9/2011 |
| CN | 102595524 A | 7/2012 |
| CN | 102695240 A | 9/2012 |
| EP | 2187677 A1 | 5/2010 |
| EP | 2237610 A1 | 10/2010 |
| EP | 2866369 A1 | 4/2015 |
| JP | 2010187261 A | 8/2010 |
| JP | 2011035925 A | 2/2011 |
| WO | 2013010418 A1 | 1/2013 |
| WO | 2014019510 A1 | 2/2014 |
| WO | 2014102598 A2 | 7/2014 |
| WO | 2014158947 A2 | 10/2014 |

\* cited by examiner

COMMUNICATION METHOD AND DEVICE

CROSS-REFERENCE TO RELATED APPLICATIONS

This application is a continuation of International Application No. PCT/CN2015/077239, filed on Apr. 22, 2015, the disclosure of which is hereby incorporated by reference in its entirety.

TECHNICAL FIELD

The present invention relates to communications technologies, and in particular, to a network access method, a device, and a system.

BACKGROUND

As communications technologies develop, radio resources become increasingly rich. For example, communications standards that separately support different radio access technologies (RAT) may be used, and new communications standards may be introduced continuously in the future. In addition, coverage of different communications standards overlaps.

User equipment (UE) needs to select a proper radio resource according to a service characteristic and the like of the user equipment to access a network. However, in the prior art, a data transmission or reception channel cannot be flexibly established for UE according to these characteristics of the UE. Consequently, an unnecessary waste is caused.

SUMMARY

In view of this, the present invention provides a method, device, and system for selecting a proper radio resource for UE, so as to appropriately and efficiently use a radio resource, and to improve quality of service (QoS) of a user.

According to a first aspect, an embodiment of the present invention provides a communication method, applied to a communications network. The communications network includes a network controller, first user equipment, and at least two access network devices. The at least two access network devices include a first access network device supporting a first communications standard and a second access network device supporting a second communications standard. The network controller receives a first message sent by the first access network device, where the first message is used to request the network controller to configure at least one access network device for the first user equipment, to implement data transmission or reception between the first user equipment and the at least one access network device. The network controller configures the second access network device for the first user equipment, where the first access network device is an access network device that implements control signaling transmission or reception with the first user equipment.

With reference to the first aspect, in a first implementation of the first aspect, the network controller configures the third access network device for the first user equipment.

With reference to the first aspect or the foregoing implementation, in a second implementation of the first aspect, the first message includes access capability information of the first user equipment, and the network controller configures the at least one access network device for the first user equipment according to the access capability information, to implement data transmission or reception between the first user equipment and the at least one access network device.

With reference to the first aspect or the foregoing implementations, in a third implementation of the first aspect, the requesting the network controller to configure at least one access network device for the first user equipment, to implement data transmission or reception between the first user equipment and the at least one access network device is specifically: requesting the network controller to configure, for the first user equipment, a user plane protocol stack corresponding to the at least one access network device.

With reference to the first aspect or the foregoing implementations, in a fourth implementation of the first aspect, the implementing control signaling transmission or reception with the first user equipment is specifically: implementing the control signaling transmission or reception with the first user equipment by using a control plane protocol stack.

With reference to the first aspect or the foregoing implementations, in a fifth implementation of the first aspect, the network controller sends a second message to the first user equipment by using the first access network device, where the second message is used to indicate the at least one access network device configured by the network controller.

With reference to the first aspect or the foregoing implementations, in a sixth implementation of the first aspect, the communications network further includes second user equipment and a fourth access network device that implements data transmission or reception with the second user equipment, the first user equipment needs to transmit data to the second user equipment; the network controller receives the data sent by the first user equipment by using an access network device that implements data transmission or reception with the first user equipment; and the network controller sends the data to the second user equipment by using the fourth access network device.

With reference to the first aspect or the foregoing implementations, in a seventh implementation of the first aspect, the communications network further includes third user equipment and a fifth access network device that implements data transmission or reception with the third user equipment, the first user equipment needs to perform Wireless Fidelity peer-to-peer Wi-Fi P2P communication with the third user equipment; and the network controller receives a third message sent by the user equipment by using an access network device that implements data transmission or reception with the first user equipment, where the third message is used to request to perform Wi-Fi P2P communication with the third user equipment; and the network controller configures a channel resource for the first user equipment and the third user equipment according to the third message, to implement Wi-Fi P2P communication between the first user equipment and the third user equipment.

With reference to the first aspect or the foregoing implementations, in an eighth implementation of the first aspect, the first communications standard is a wireless cellular network standard, and the second communications standard is a wireless local area network standard.

According to a second aspect, an embodiment of the present invention provides a network controller, applied to a communications network. The communications network includes the network controller, first user equipment, and at least two access network devices. The at least two access network devices include a first access network device supporting a first communications standard and a second access network device supporting a second communications standard. The network controller includes: a receiving unit, configured to receive a first message sent by the first access network device, where the first message is used to request the network controller to configure at least one access network device for the first user equipment, to implement data transmission or reception between the first user equipment and the at least one access network device. The network controller also includes a processing unit, configured to configure the second access network device for the first user equipment, where the first access network device is an access network device that implements control signaling transmission or reception with the first user equipment.

With reference to the second aspect, in a first implementation of the second aspect, the processing device is further configured to configure the third access network device for the first user equipment.

With reference to the second aspect or the foregoing implementation, in a second implementation of the second aspect, the first message includes access capability information of the first user equipment, and the processing device configures the at least one access network device for the first user equipment according to the access capability information, to implement data transmission or reception between the first user equipment and the at least one access network device.

With reference to the second aspect or the foregoing implementations, in a third implementation of the second aspect, the requesting the network controller to configure at least one access network device for the first user equipment, to implement data transmission or reception between the first user equipment and the at least one access network device is specifically: requesting the network controller to configure, for the first user equipment, a user plane protocol stack corresponding to the at least one access network device.

With reference to the second aspect or the foregoing implementations, in a fourth implementation of the second aspect, the implementing control signaling transmission or reception with the first user equipment is specifically: implementing the control signaling transmission or reception with the first user equipment by using a control plane protocol stack.

With reference to the second aspect or the foregoing implementations, in a fifth implementation of the second aspect, the network controller further includes: a sending unit, configured to send a second message to the first user equipment by using the first access network device, where the second message is used to indicate the at least one access network device configured by the network controller.

With reference to the second aspect or the foregoing implementations, in a sixth implementation manner of the second implementation of the second aspect, the communications network further includes second user equipment and a fourth access network device that implements data transmission or reception with the second user equipment, and the first user equipment needs to transmit data to the second user equipment; the receiving unit is further configured to receive the data sent by the first user equipment by using an access network device that implements data transmission or reception with the first user equipment; and the sending unit is further configured to send the data to the second user equipment by using the fourth access network device.

With reference to the second aspect or the foregoing implementations, in a seventh implementation of the second aspect, the communications network further includes third user equipment and a fifth access network device that implements data transmission or reception with the third user equipment, and the first user equipment needs to perform Wireless Fidelity peer-to-peer Wi-Fi P2P communication with the third user equipment; the receiving unit is further configured to receive a third message sent by the user equipment by using an access network device that implements data transmission or reception with the first user equipment, where the third message is used to request to perform Wi-Fi P2P communication with the third user equipment; and the processing unit is further configured to configure a channel resource for the first user equipment and the third user equipment according to the third message, to implement Wi-Fi P2P communication between the first user equipment and the third user equipment.

With reference to the second aspect or the foregoing implementations, in an eighth implementation of the second aspect, the first communications standard is a wireless cellular network standard, and the second communications standard is a wireless local area network standard.

According to a third aspect, an embodiment of the present invention provides another communication method, applied to a communications network. The communications network includes a network controller, first user equipment, and at least two access network devices. The at least two access network devices include a first access network device supporting a first communications standard and a second access network device supporting a second communications standard. The method includes: sending, by the first user equipment, a first message to the network controller by using the first access network device, where the first message is used to request the network controller to configure at least one access network device for the first user equipment, to implement data transmission or reception between the first user equipment and the at least one access network device. The method also includes receiving, by the first user equipment, a second message sent by the network controller by using the first access device, where the second message is used to indicate that the at least one access network device configured by the network controller includes the second access device, where the first access network device is an access network device that implements control signaling transmission or reception with the first user equipment.

With reference to the third aspect, in a first implementation of the third aspect, the communications network further includes a third access network device supporting a third communications standard, and the at least one access device indicated by the second message and configured by the network controller further includes the third access network device.

With reference to the third aspect or the foregoing implementation, in a second implementation of the third aspect, the first message includes access capability information of the first user equipment, so that the network controller configures the at least one access network device for the first user equipment according to the access capability information, to implement data transmission or reception between the first user equipment and the at least one access network device.

With reference to the third aspect or the foregoing implementations, in a third implementation of the third aspect, the requesting the network controller to configure at least one access network device for the first user equipment, to implement data transmission or reception between the first user equipment and the at least one access network device is specifically: requesting the network controller to configure, for the first user equipment, a user plane protocol stack corresponding to the at least one access network device.

With reference to the third aspect or the foregoing implementations, in a fourth implementation of the third aspect, the implementing control signaling transmission or reception with the first user equipment is specifically: implementing the control signaling transmission or reception with the first user equipment by using a control plane protocol stack.

With reference to the third aspect or the foregoing implementations, in a fifth implementation of the third aspect, the communications network further includes second user equipment and a fourth access network device that implements data transmission or reception with the second user equipment, the first user equipment needs to transmit data to the second user equipment, and the method further includes: sending, by the first user equipment, the data to the network controller by using an access network device that implements data transmission or reception with the first user equipment, so that the network controller sends the data to the second user equipment by using the fourth access network device.

With reference to the third aspect or the foregoing implementations, in a sixth implementation of the third aspect, the communications network further includes third user equipment and a fifth access network device that implements data transmission or reception with the third user equipment, the first user equipment needs to perform Wireless Fidelity peer-to-peer Wi-Fi P2P communication with the third user equipment, and the method further includes: sending, by the first user equipment, a third message to the network controller by using an access network device that implements data transmission or reception with the first user equipment, where the third message is used to request to perform Wi-Fi P2P communication with the third user equipment; and receiving, by the first user equipment, a fourth message sent by the network controller by using the access network device that implements data transmission or reception with the first user equipment, where the fourth message is used to indicate a channel resource configured by the network controller for the first user equipment and the third user equipment.

With reference to the third aspect or the foregoing implementations, in a seventh implementation of the third aspect, the first communications standard is a wireless cellular network standard, and the second communications standard is a wireless local area network standard.

According to a fourth aspect, an embodiment of the present invention provides first user equipment, applied to a communications network. The communications network includes a network controller, the first user equipment, and at least two access network devices, the at least two access network devices include a first access network device supporting a first communications standard and a second access network device supporting a second communications standard. The user equipment is the first user equipment, and the first user equipment includes: a sending unit, configured to send a first message to the network controller by using the first access network device, where the first message is used to request the network controller to configure at least one access network device for the first user equipment, to implement data transmission or reception between the first user equipment and the at least one access network device. The first user equipment also includes a receiving unit, configured to receive a second message sent by the network controller by using the first access device, where the second message is used to indicate that the at least one access network device configured by the network controller includes the second access device, where the first access network device is an access network device that implements control signaling transmission or reception with the first user equipment.

With reference to the fourth aspect, in a first implementation of the fourth aspect, the communications network further includes a third access network device supporting a third communications standard, and the at least one access device indicated by the second message and configured by the network controller further includes the third access network device.

With reference to the fourth aspect or the foregoing implementation, in a second implementation of the fourth aspect, the first message includes access capability information of the first user equipment, so that the network controller configures the at least one access network device for the first user equipment according to the access capability information, to implement data transmission or reception between the first user equipment and the at least one access network device.

With reference to the fourth aspect or the foregoing implementations, in a third implementation of the fourth aspect, the requesting the network controller to configure at least one access network device for the first user equipment, to implement data transmission or reception between the first user equipment and the at least one access network device is specifically: requesting the network controller to configure, for the first user equipment, a user plane protocol stack corresponding to the at least one access network device.

With reference to the fourth aspect or the foregoing implementations, in a fourth implementation of the fourth aspect, the implementing control signaling transmission or reception with the first user equipment is specifically: implementing the control signaling transmission or reception with the first user equipment by using a control plane protocol stack.

With reference to the fourth aspect or the foregoing implementations, in a fifth implementation of the fourth aspect, the communications network further includes second user equipment and a fourth access network device that implements data transmission or reception with the second user equipment, and the first user equipment needs to transmit data to the second user equipment; and the sending unit is further configured to send the data to the network controller by using an access network device that implements data transmission or reception with the first user equipment, so that the network controller sends the data to the second user equipment by using the fourth access network device.

With reference to the fourth aspect or the foregoing implementations, in a sixth implementation of the fourth aspect, the communications network further includes third user equipment and a fifth access network device that implements data transmission or reception with the third user equipment, and the first user equipment needs to perform Wireless Fidelity peer-to-peer Wi-Fi P2P communication with the third user equipment; the sending unit is further configured to send a third message to the network controller by using an access network device that implements data transmission or reception with the first user equipment, where the third message is used to request to perform Wi-Fi P2P communication with the third user equipment; and the receiving unit is further configured to receive a fourth message sent by the network controller by using the access network device that implements data transmission or reception with the first user equipment, where the fourth message is used to indicate a channel resource configured by the network controller for the first user equipment and the third user equipment.

With reference to the fourth aspect or the foregoing implementations, in a seventh implementation of the fourth aspect, the first communications standard is a wireless cellular network standard, and the second communications standard is a wireless local area network standard.

According to a fifth aspect, an embodiment of the present invention provides another network controller, applied to a communications network. The communications network includes the network controller, first user equipment, and at least two access network devices. The at least two access network devices include a first access network device supporting a first communications standard and a second access network device supporting a second communications standard. The network controller includes a receiver, a processor, a bus, a memory, and a transmitter, where the processor obtains an instruction in the memory by using the bus, so as to configure the second access network device for the first user equipment; and the receiving unit is configured to receive a first message sent by the first access network device, where the first message is used to request the network controller to configure at least one access network device for the first user equipment, to implement data transmission or reception between the first user equipment and the at least one access network device, and the first access network device is an access network device that implements control signaling transmission or reception with the first user equipment.

According to a sixth aspect, an embodiment of the present invention provides another first user equipment, applied to a communications network. The communications network includes a network controller, the first user equipment, and at least two access network devices. The at least two access network devices include a first access network device supporting a first communications standard and a second access network device supporting a second communications standard. The first user equipment includes a receiver, a processor, a bus, a memory, and a transmitter, where the transmitter is configured to send a first message to the network controller by using the first access network device, where the first message is used to request the network controller to configure at least one access network device for the first user equipment, to implement data transmission or reception between the first user equipment and the at least one access network device. The receiver is configured to receive a second message sent by the network controller by using the first access device, where the second message is used to indicate that the at least one access network device configured by the network controller includes the second access device, where the first access network device is an access network device that implements control signaling transmission or reception with the first user equipment.

According to the technical solutions provided in the embodiments of the present invention, a network controller is introduced, to configure at least one access network device for UE, so that the UE can use multiple access network devices to implement data transmission or reception. In the technical solutions in the embodiments of the present invention, a more appropriate data transmission or reception channel can be established for the UE.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
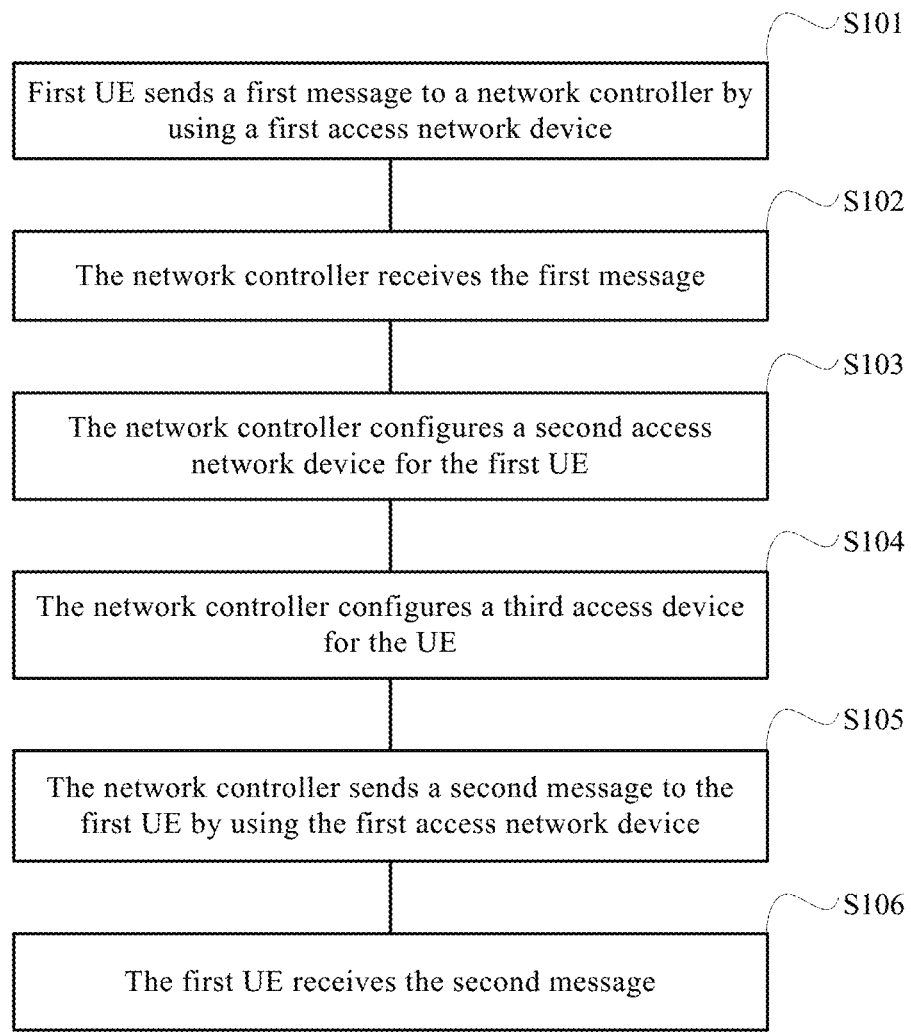
FIG. 1 is a flowchart of a communication method according to an embodiment of the present invention.

To make technical solutions of the present invention clearer, the following describes the technical solutions in the embodiments of the present invention with reference to the accompanying drawings in the embodiments of the present invention. Apparently, the following embodiments are a part rather than all of the embodiments of the present invention.

Currently, a second generation (2G) network, a third generation (3G) network, and a fourth generation (4G) network are widely applied. The 2G network includes a Global System for Mobile Communications (GSM). The 3G network includes a Code Division Multiple Access (CDMA) system, a Time Division Multiple Access (TDMA) system, a Frequency Division Multiple Access (FDMA) system, an orthogonal frequency division multiple access (OFDMA) system, a single carrier frequency division multiple access (SC-FDMA) system, and the like. The 4G network includes a Long Term Evolution (LTE) system, an LTE Advanced (LTE-A) system, and the like. In addition, a wireless local area network (WLAN) and the like are also applied.

These networks have different characteristics. For example, the WLAN has small coverage and a high transmission or reception rate, but relatively low reliability. The LTE network has large coverage and relatively high reliability. In addition, to adapt to increasing data traffic, a large quantity of micro base stations are being deployed. A micro base station has small coverage, but a good channel condition and a high data transfer rate. Correspondingly, a macro base station has large coverage, but a low data transfer rate.

It is not difficult to deduce that a future network is a heterogeneous network in which multiple standards and multiple cells coexist. UE that supports multiple services has different QoS requirements with respect to different services. For example, voice communication requires a high transmission or reception rate and a small delay; file transmission or reception requires high reliability.

In a current network, an objective of radio resource allocation is to improve spectrum utilization efficiency of a network (supporting one communications standard). For example, for an anti-interference coordination algorithm, a primary task is coordinating interference of different cells in a same network; a network handover is mainly a handover between cells in a same network.

Therefore, with respect to UE that has different access capabilities and bears multiple services, a data transmission or reception channel needs to be appropriately established for the UE.

According to the technical solutions provided in the embodiments of the present invention, a network controller is introduced, to configure at least one access network device for UE, so that the UE can use multiple access network devices to implement data transmission or reception. In the technical solutions in the embodiments of the present invention, a more appropriate data transmission or reception channel can be established for the UE.

FIG. 1 is a flowchart of a communication method according to an embodiment of the present invention. The method is a method of interaction between a network controller and first UE. The method includes the following steps.

S101. The first UE sends a first message to the network controller by using a first access network device.

S102. The network controller receives the first message.

S103. The network controller configures a second access network device for the first UE.

The network controller is a newly constructed network element device in this embodiment of the present invention. A radio resource used by the UE for data transmission or reception may be controlled by the network controller.

This embodiment of the present invention is mainly applied to a heterogeneous network, that is, a network in which multiple standards and multiple cells coexist. The heterogeneous network includes a network controller, and further includes multiple access network devices. An access network device may be a macro base station, or may be a small cell. For example, the access network device may be an eNodeB, or may be a small cell such as a home eNodeB (HeNB), a micro base station, or a pico base station; the access network device may include a NodeB and a radio network controller (RNC), or the access network device may include a base station controller (BSC) and a base transceiver station (BTS); or the access network device may be an access point (AP). This is not limited herein.

Figure 2:
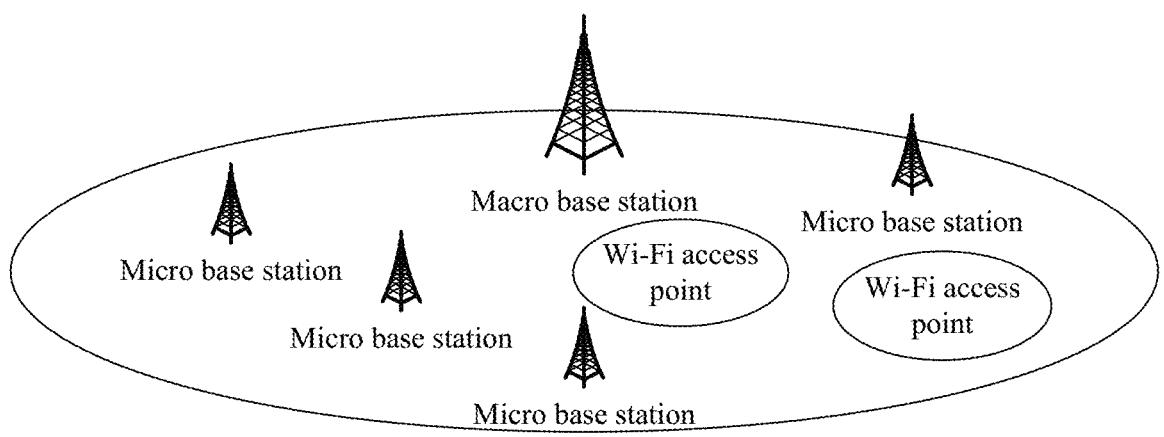
FIG. 2 is a network architectural diagram according to an embodiment of the present invention.

As shown in FIG. 2, the first access device in this embodiment of the present invention may be a macro base station, and multiple access network devices exist in coverage of the macro base station. These access devices may be micro base stations, or may be Wireless Fidelity (Wi-Fi) base stations. This is not limited herein. The multiple access devices in coverage of these macro base stations may separately support multiple communications standards. A communications standard supported by at least one access network device is different from that supported by the macro base station. That is, a heterogeneous network is constructed. The macro base station manages the multiple access network devices, and the multiple access network devices may communicate with each other. A network controller, as a network element device, manages access network devices that exist in the heterogeneous network.

In this embodiment, the macro base station sends broadcast information to UE in the coverage of the macro base station. The broadcast information may include radio transmission or reception parameters of the macro base station, such as a frequency and a supported communications standard, and may also include information about the access network devices that are managed by the macro base station, such as information about a micro base station and a Wi-Fi base station.

The first UE determines, according to the received broadcast information and with reference to an access capability of the first UE, whether to access the macro base station. If the first UE determines to access the macro base station, the first UE may send the first message, to request to implement control signaling transmission or reception with the accessed macro base station.

Optionally, control signaling transmission or reception may be implemented between the first UE and the macro base station. Control signaling transmission or reception between the first UE and the macro base station may be implemented between the first UE and the macro base station by using a control plane protocol stack there between.

Optionally, the access capability of the first UE is at least one of a UE capability, a service class, or a QoS requirement. Optionally, the first message may include access capability information of the first UE.

To implement data transmission or reception between the first UE and a network side, the macro base station forwards the first message to the network controller.

Optionally, data transmission or reception between the first UE and the network side may be implemented between the first UE and an access network device by using a user plane protocol stack therebetween.

The network controller may configure at least one access network device for the first UE according to information included in the first message, such as the access capability information of the first UE, to implement data transmission or reception between the first UE and the at least one access network device. When the network controller configures an access network device for the first UE, the access network device may be the second access network device. A communications standard supported by the second access network device may be different from the communications standard supported by the macro base station, that is, the first access device. Certainly, in an actual case, a communications standard supported by the first access network device may be the same as a communications standard supported by the second access network device. This is not limited herein.

Optionally, this embodiment of the present invention further includes the following step.

S104. The network controller configures a third access device for the UE.

In the heterogeneous network, the macro base station, that is, the first access network device may further manage the third access network device. A communications standard supported by the third access network device may be different from the communications standard supported by the second access network device. Alternatively, on the premise that data transmission or reception is implemented between the first UE and the second access network device, the network controller may simultaneously configure the third access network device for the first UE. In this way, the first UE may implement data transmission or reception with the second access network device and then with the third access network device or simultaneously implement data transmission or reception with the second network device and the third access network device. The two access network devices respectively support two different communications standards.

It should be noted that S103 and S104 may be performed simultaneously or sequentially. This is not limited herein.

Certainly, according to an actual requirement, the network controller may configure three or more access network devices for the first UE. That is, in this embodiment of the present invention, the network controller configures at least one access network device for the UE for data transmission or reception. When the network controller configures three or more access network devices for the first UE, at least one of communications standards supported by the three or more access network devices may be different from the communications standard supported by the macro base station. Optionally, the three or more access network devices may separately support two or more communications standards. Optionally, in this case, an access network device that implements control signaling transmission or reception with the first UE and an access network device that implements data transmission or reception with the first UE may support different communications standards. For example, the macro base station supports a communications standard 1, the network controller configures three access network devices for the UE, and the three access network devices respectively support a communications standard 2, a communications standard 3, and a communications standard 4. The communications standard 1, the communications standard 2, the communications standard 3, and the communications standard 4 are different from one another.

Optionally, this embodiment of the present invention may further include the following steps.

S105. The network controller sends a second message to the first UE by using the first access network device.

S106. The first UE receives the second message.

The second message is used to indicate the at least one access network device configured by the network controller. Specifically, the second message may indicate the second access network device, the second access network device and the third access network device, or more access network devices in the foregoing steps. The second message may include radio transmission or reception parameters, such as a frequency that needs to be used and a supported communications standard, used in data transmission or reception between the first UE and the configured at least one access network device.

After learning the access network device that may perform data transmission or reception with the first UE, the first UE may send an uplink access signal to the access network device, so as to implement data transmission or reception with the network side.

Optionally, the network controller may further send the access capability information of the first UE to an access network device configured by the network controller for the first UE. In this way, the configured access network device may adjust communication with the UE more appropriately according to the access capability information of the first UE.

Certainly, the network controller may alternatively send a notification message directly to the access network device configured by the network controller. The notification message is used to instruct the configured access network device to implement data transmission or reception with the first UE. Optionally, the notification message may further include radio transmission or reception parameters such as a frequency and a supported communications standard.

Optionally, the radio configuration parameters such as the frequency may be previously configured default parameters, or parameters configured in a process of configuring, by the network controller, an access network device for the first UE. This is not limited herein.

After the first UE accesses a network, when the network further includes second UE and a fourth access network device that implements data transmission or reception with the second UE, and when the first UE needs to transmit data to the second UE, in a solution in the prior art, the data needs to be transmitted by using a core network. This method increases a communications delay and deteriorates QoS of UE.

Figure 3:
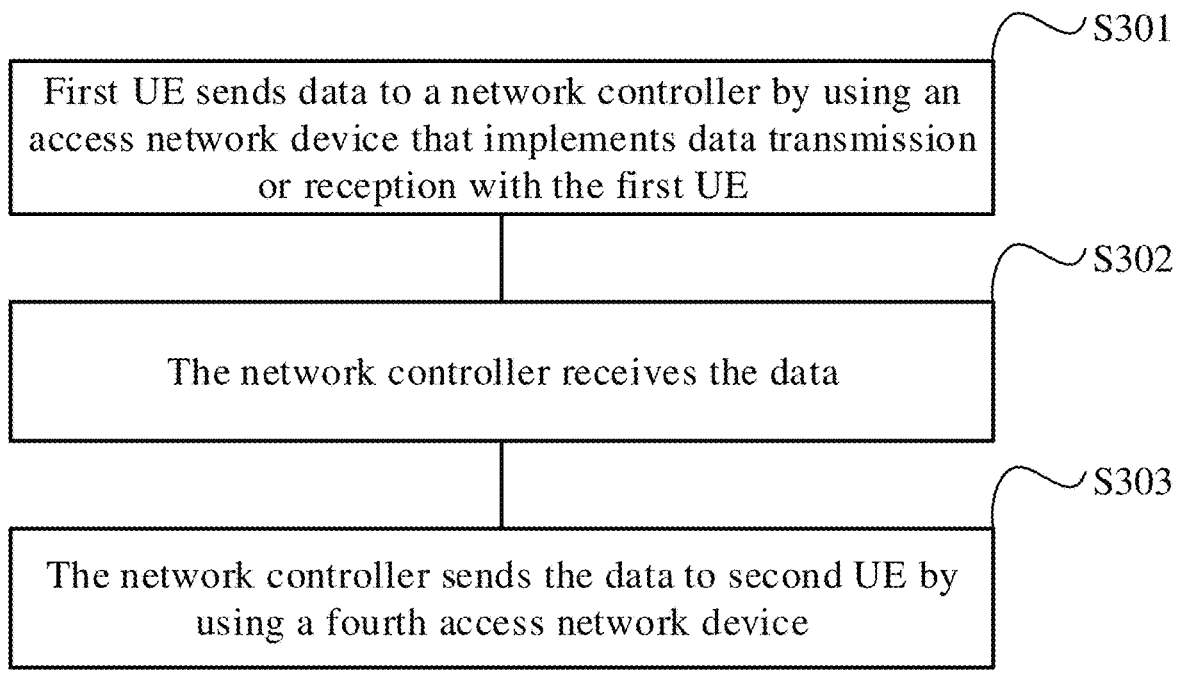
FIG. 3 is a flowchart of another communication method according to an embodiment of the present invention.

To resolve the foregoing technical problem, an embodiment of the present invention provides a technical solution. As shown in FIG. 3, the method is a method of interaction between first UE and a network controller, and may include the following steps.

S301. The first UE sends data to the network controller by using an access network device that implements data transmission or reception with the first UE.

S302. The network controller receives the data.

S303. The network controller sends the data to second UE by using a fourth access network device.

In this solution, a network controller implements a data transmission or reception function, without using a core network side. Therefore, a communications delay is decreased, service data is transmitted efficiently and conveniently, and QoS of a user is improved.

Optionally, the access network device that implements data transmission or reception with the first UE may be a second access network device or a third access network device in the embodiment shown in FIG. 1.

When the first UE needs to perform Wireless Fidelity peer-to-peer Wi-Fi P2P communication with the second UE, a manner in the prior art is that a terminal autonomously selects a channel resource, and in this solution, a radio resource cannot be used flexibly and effectively.

Figure 4:
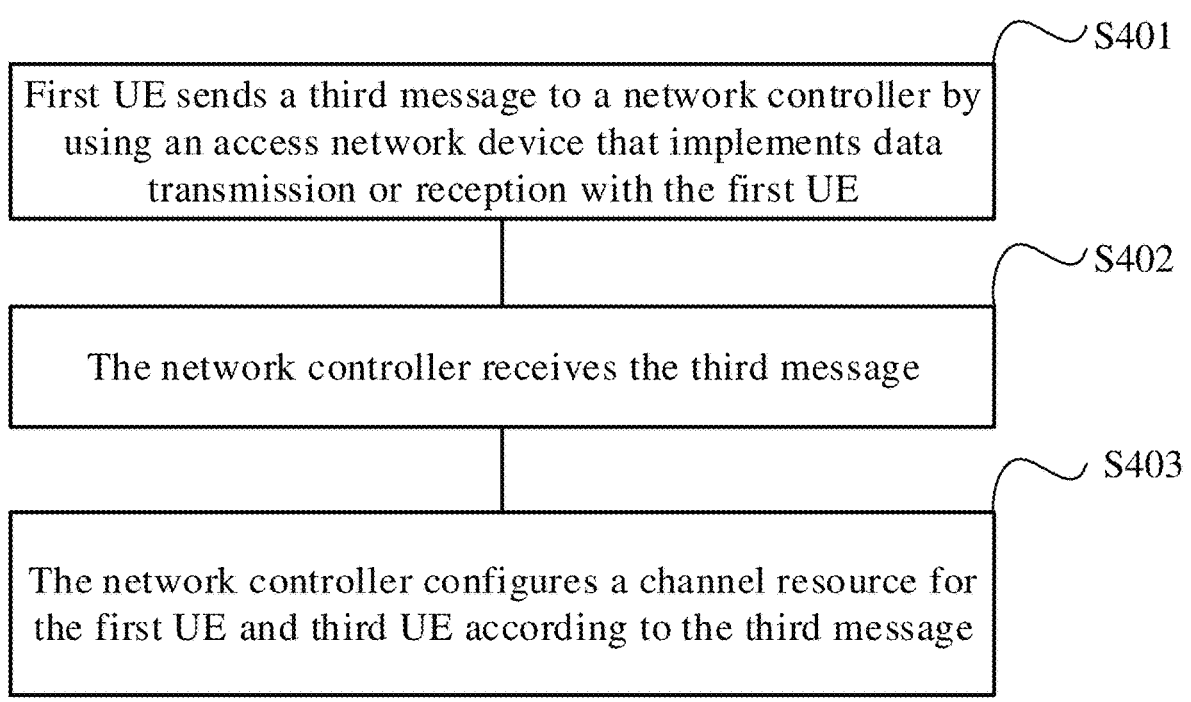
FIG. 4 is a flowchart of another communication method according to an embodiment of the present invention.

To resolve the foregoing technical problem, an embodiment of the present invention provides a technical solution. As shown in FIG. 4, the method is a method of interaction between first UE and a network controller, and may include the following steps.

S401. The first UE sends a third message to the network controller by using an access network device that implements data transmission or reception with the first UE.

S402. The network controller receives the third message.

S403. The network controller configures a channel resource for the first UE and second UE according to the third message.

According to the technical solution provided in this embodiment of the present invention, a network controller configures a channel resource for UE that requests Wi-Fi P2P communication, so that a radio channel resource can be used appropriately and efficiently, and QoS of the UE is improved.

The third message may be used to request to perform Wi-Fi P2P communication with the second UE.

Figure 5:
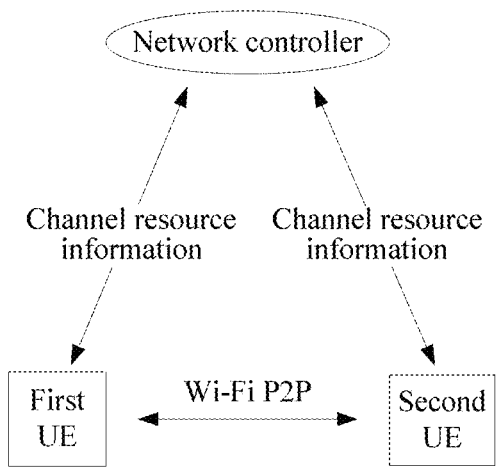
FIG. 5 is a Wireless Fidelity peer-to-peer Wi-Fi P2P communication diagram according to an embodiment of the present invention.

As shown in FIG. 5, the first UE and the second UE are in a management range of one network controller. The network controller configures a channel resource for the Wi-Fi P2P communication, and then separately sends channel resource information to the first UE and the second UE by using the access network device that implements data transmission or reception with the first UE and by using a fourth access network device. The channel resource may include information such as a frequency required in the Wi-Fi P2P communication and a used communications standard.

When service load, an interference level, and the like change, the network controller may update the channel resource and separately send channel resource information to the first UE and the second UE in time by using the access network device that implements data transmission or reception with the first UE and by using the fourth access network device.

When the first UE needs to switch to a target access network device, the network controller may send a switching command to the first UE by using a source access network device (an access network device that previously implements data transmission or reception with the first user equipment in this method). The switching command includes the target access network device to which the first UE needs to switch.

Optionally, before this step, the network controller sends a measurement command to the first UE by using the source access network device. The measurement command may include information such as a communications standard and a frequency of the target access network device.

The first UE measures, according to the measurement command, signal quality of a service cell corresponding to the target access network device.

The first UE sends a measurement result to the network controller by using the source access network device.

Optionally, the network controller sends access capability information of the first UE to the target access network device, or may send related frequency information, a used communications standard, and the like to the target access network device.

Figure 6:
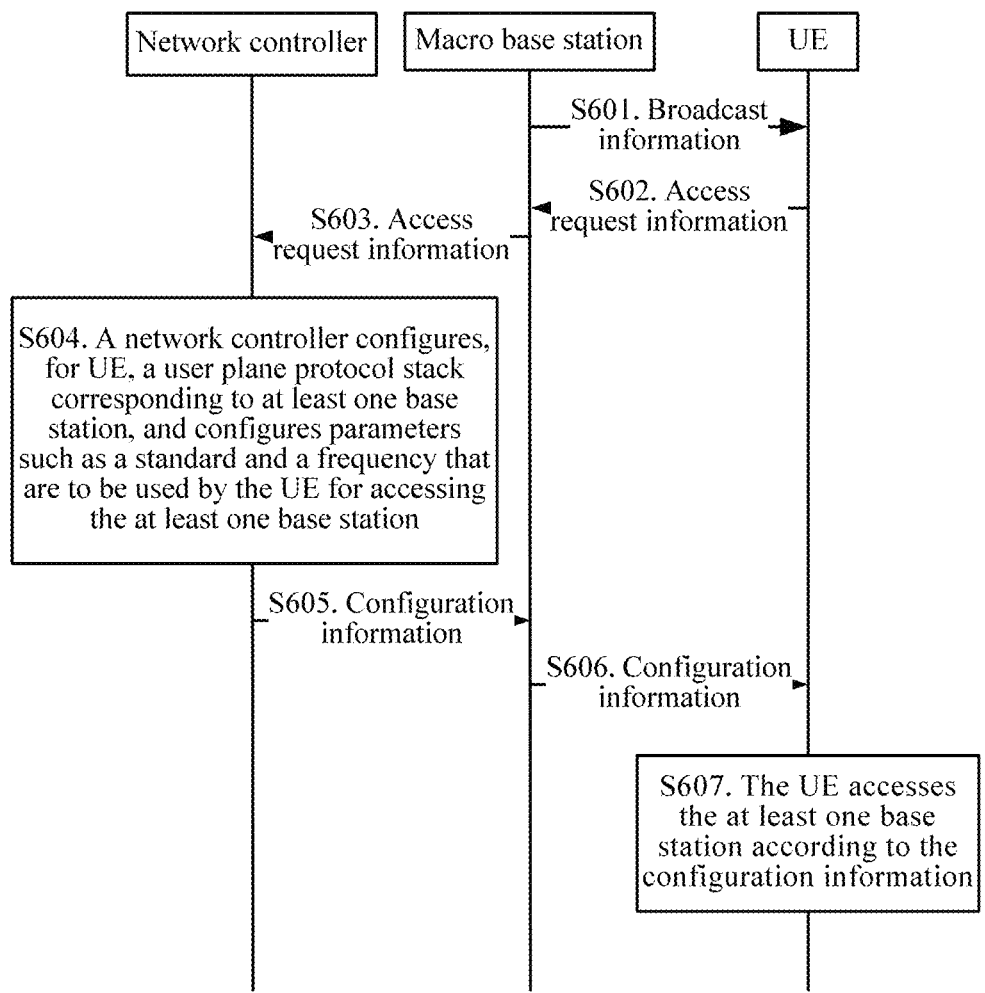
FIG. 6 is a specific interaction flowchart of a communication method according to an embodiment of the present invention.

FIG. 6 is an interaction flowchart of a network access method according to an embodiment of the present invention. The method is a specific interaction procedure of the method shown in FIG. 1, and includes the following steps.

S601. A macro base station sends broadcast information.

The broadcast information may be carried in a broadcast frame and include radio transmission or reception parameters of the macro base station, such as a frequency and a supported communications standard, and may also include information about access network devices that are managed by the macro base station, such as information about a micro base station and a Wi-Fi base station.

S602. UE sends access request information to the macro base station.

The access request information may be carried in a radio resource control connection setup (RRC connection setup) message, and include access capability information of the UE.

S603. The macro base station forwards the access request information to a network controller.

S604. The network controller configures, for the UE, a user plane protocol stack corresponding to at least one base station, and configures parameters such as a standard and a frequency that are used by the UE for accessing the at least one base station.

S605. The network controller sends configuration information to the macro base station.

The configuration information may be carried in a radio resource control connection configuration (RRC connection configuration) message, and include information indicating the at least one base station and parameter information such as the standard and the frequency that are used by the UE for accessing the at least one base station.

S606. The macro base station forwards the configuration information to the UE.

S607. The UE accesses the at least one base station according to the configuration information.

Figure 7:
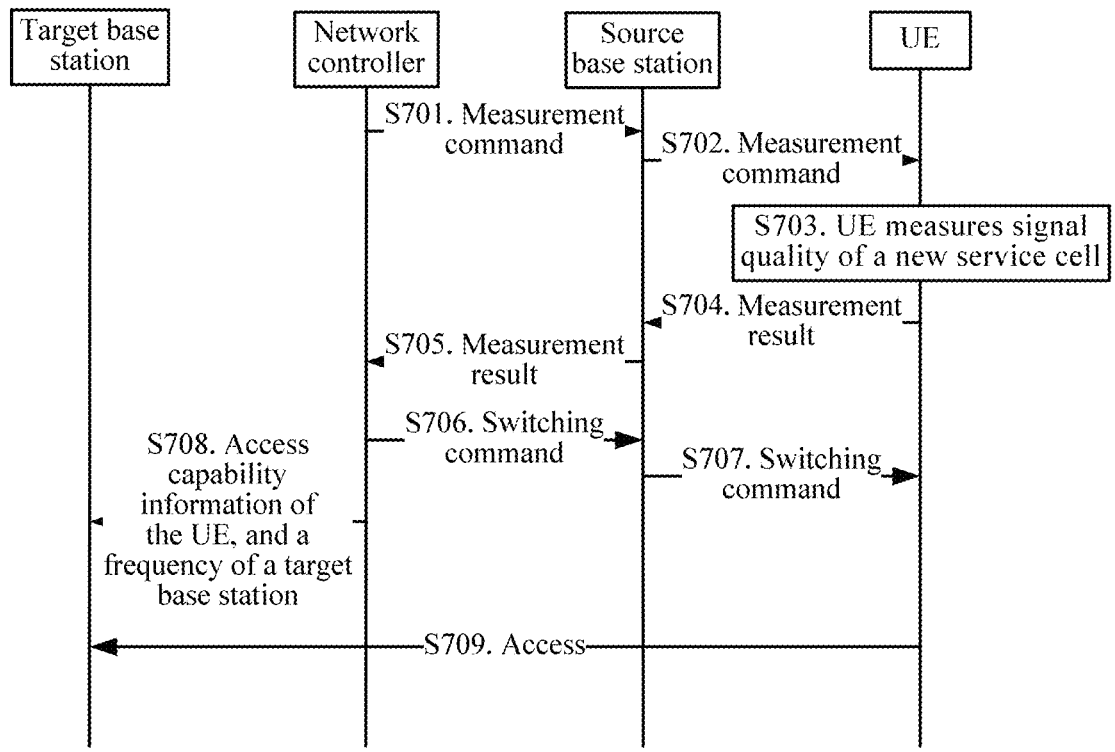
FIG. 7 is a specific interaction flowchart of another communication method according to an embodiment of the present invention.

FIG. 7 is an interaction flowchart of another communication method according to an embodiment of the present invention. The method is a specific procedure in which first UE switches to a target base station. When the UE needs to switch to the target base station, this embodiment of the present invention may further include the following steps.

S701. A network controller sends a measurement command to a source base station.

The source base station is a base station establishing a user plane with the UE in FIG. 4. The measurement command may include information such as a communications standard and a frequency of the target base station.

S702. The source base station forwards the measurement command to the UE.

S703. The UE measures signal quality of the target base station.

S704. The UE sends a measurement result to the source base station.

S705. The source base station forwards the measurement result to the network controller.

When determining, according to the measurement result, to switch the UE to the target base station, the network controller performs the following step.

S706. The network controller sends a switching command to the source base station.

The switching command is used to instruct the UE to switch to the target base station.

The switching command may include the information such as the frequency and the used communications standard of the accessed target base station.

S707. The base station forwards the switching command to the UE.

S708. The network controller sends information such as access capability information of the UE and a frequency of the target base station to the target base station.

S709. The UE accesses the target base station according to the switching command.

Figure 8:
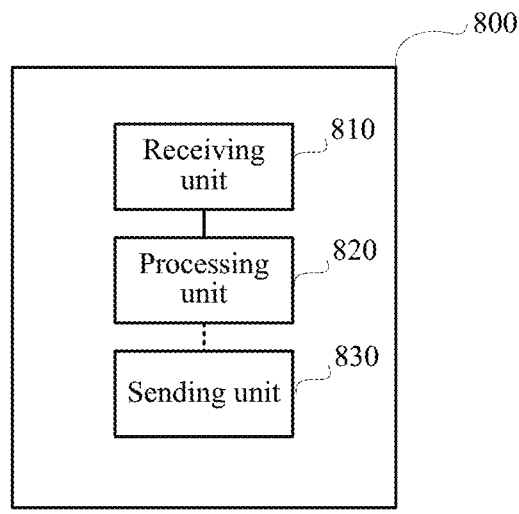
FIG. 8 is a schematic structural diagram of a network controller according to an embodiment of the present invention.
Figure 9:
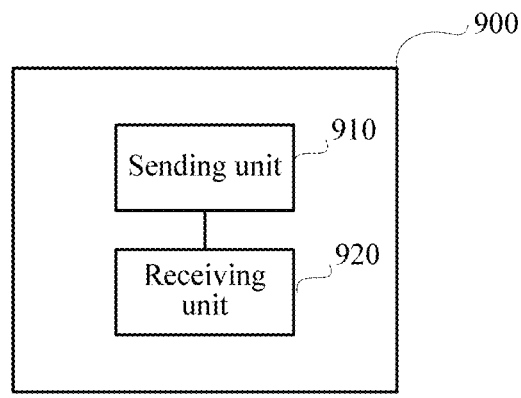
FIG. 9 is a schematic structural diagram of user equipment according to an embodiment of the present invention.

To implement the technical solutions in the embodiments shown in FIG. 1 to FIG. 7 of the present invention, an embodiment of the present invention further provides a network controller 800 and first UE 900. As shown in FIG. 8, FIG. 8 is a schematic structural diagram of the network controller 800. As shown in FIG. 9, FIG. 9 is a schematic structural diagram of the first UE 900.

The network controller 800 includes a receiving unit 810 and a processing unit 820.

The receiving unit 810 is configured to receive a first message sent by a first access network device, where the first message is used to request the network controller to configure at least one access network device for the first UE, to implement data transmission or reception between the first UE and the at least one access network device.

The processing unit 820 is configured to configure a second access network device for the first UE.

The first user equipment 900 includes a sending unit 910 and a receiving unit 920.

The sending unit 910 is configured to send the first message to the network controller by using the first access network device, where the first message is used to request the network controller to configure the at least one access network device for the first UE, to implement data transmission or reception between the first UE and the at least one access network device.

The receiving unit 920 is configured to receive a second message sent by the network controller by using the first access device, where the second message is used to indicate that the at least one access network device configured by the network controller includes the second access device.

This embodiment of the present invention may be applied to a heterogeneous network. The network includes a network controller, first UE, and at least two access network devices. The at least two access network devices include a first access network device supporting a first communications standard and a second access network device supporting a second communications standard. For an application scenario in this embodiment of the present invention, refer to descriptions in the foregoing corresponding method embodiments. Details are not described herein again.

The first access network device may be a macro base station. The macro base station first sends broadcast information to UE in coverage of the macro base station. The broadcast information may include radio transmission or reception parameters of the macro base station, such as a frequency and a supported communications standard, and may also include information about access network devices that are managed by the macro base station, such as information about a micro base station and a Wi-Fi base station.

The first UE 7900 determines, according to the received broadcast information and with reference to an access capability of the first UE 7900, whether to access the macro base station. If the first UE 7900 determines to access the macro base station, the sending unit 7910 of the first UE 7900 may send the first message to request to access the macro base station.

Optionally, control signaling transmission or reception may be implemented between the first UE 900 and the macro base station. Further, the control signaling transmission or reception may be implemented between the first UE 900 and the macro base station by using a control plane protocol stack therebetween.

Optionally, the access capability of the first UE 900 is at least one of a UE capability, a service class, or a QoS requirement. Optionally, the first message may include access capability information of the first UE.

To implement data transmission or reception between the first UE 900 and a network side, the macro base station forwards the first message to the network controller 800.

Optionally, data transmission or reception between the first UE 900 and the network side may be implemented between the first UE 900 and an access network device by using a user plane protocol stack therebetween.

The processing unit 6820 of the network controller 6800 may configure at least one access network device for the first UE 7900 according to information included in the first message, such as the access capability information of the first UE 6800, to implement data transmission or reception between the first UE 7900 and the at least one access network device. When the network controller 6800 configures an access network device for the first UE, the access network device may be the second access network device. A communications standard supported by the second access network device may be different from that supported by the macro base station, that is, the first access device. Certainly, in an actual case, a communications standard supported by the first access network device may be the same as a communications standard supported by the second access network device. This is not limited herein.

Optionally, the processing unit 820 of the network controller 800 may further configure a third access network device for the first UE 900. A communications standard supported by the third access network device may be different from the communications standard supported by the second access network device. Alternatively, on the premise that data transmission or reception is implemented between the first UE 900 and the second access network device, the processing unit 820 of the network controller 800 may simultaneously configure the third access network device for the first UE 900. In this way, the first UE 900 may implement data transmission or reception with the second access network device and then with the third access network device or simultaneously implement data transmission or reception with the second network device and the third access network device. The two access network devices respectively support two different communications standards. According to an actual requirement, the processing unit 820 of the network controller 800 may configure three or more access network devices for the first UE 900. When the processing unit 820 of the network controller 800 configures three or more access network devices for the first UE 900, at least one of communications standards supported by the three or more access network devices is different from the communications standard supported by the macro base station.

Optionally, the first UE 7900 is notified of the foregoing configuration information, so that the first UE 7900 learns an access network device that may perform data transmission or reception with the first UE 900, and then data transmission or reception with the access network device configured by the network controller 6800 is implemented. In this case, the network controller 6800 may further include: a sending unit 6830, configured to send the second message to the first UE by using the first access network device. The second message is used to indicate the at least one access network device configured by the network controller 6800. Specifically, the second message may indicate the second access network device, the second access network device and the third access network device, or more access network devices in the foregoing steps. The second message may further include radio transmission or reception parameters, such as a frequency that needs to be used and a supported communications standard, used in data transmission or reception between the first UE and the configured at least one access network device.

According to the technical solution provided in this embodiment of the present invention, a network controller configures at least one access network device for UE, so that the UE can use multiple access network devices to implement data transmission or reception. In the technical solution in this embodiment of the present invention, the UE may select to use a more appropriate data channel for data transmission or reception.

Optionally, when a network further includes second UE and a fourth access network device that implements data transmission or reception with the second UE, and when the first UE 900 needs to transmit data to the second UE, the sending unit 910 of the first UE 900 is further configured to send the data to the network controller by using an access network device that implements data transmission or reception with the first UE, the receiving unit 810 of the network controller 800 is further configured to receive the data, and the sending unit 830 of the network controller 800 is further configured to send the data to the second UE by using the fourth access network device.

Compared with the prior art in which data needs to be transmitted by using a core network, in the technical solution provided in this embodiment of the present invention, a network controller implements a data transmission or reception function, without using a core network side. Therefore, a communications delay is decreased, service data is transmitted efficiently and conveniently, and QoS of a user is improved.

Optionally, when the first UE 900 needs to perform Wireless Fidelity peer-to-peer Wi-Fi P2P communication with the second UE, the sending unit 910 of the first UE is further configured to send a third message to the network controller by using an access network device that implements data transmission or reception with the first user equipment, where the third message may be used to request to perform Wi-Fi P2P communication with the second UE, the receiving unit 810 of the network controller 800 is further configured to receive the third message, and the processing unit 820 of the network controller 800 is further configured to configure a channel resource for the first UE 900 and the second UE according to the third message.

Compared with a manner in which a terminal autonomously selects a channel resource in the prior art, in the technical solution provided in this embodiment of the present invention, a network controller configures a channel resource for UE that requests Wi-Fi P2P communication, so that a radio channel resource can be used appropriately and efficiently, and QoS of the UE is improved.

Further, when service load, an interference level, and the like change, the network controller may update the channel resource and separately send channel resource information to the first UE and the second UE in time by using the access network device that implements data transmission or reception with the first UE and by using the fourth access network device.

Optionally, when the first UE 900 needs to switch to a target access network device, the sending unit 830 of the network controller 80000 may send a switching command to the first UE 900 by using a source access network device (an access network device that previously implements data transmission or reception with the first UE in this method). The switching command includes the target access network device to which the first UE 900 needs to switch.

Optionally, functions of the network controller 800 and the first UE 900 provided in this embodiment of the present invention may be implemented by a processor and a transceiver in a cooperative manner.

Figure 10:
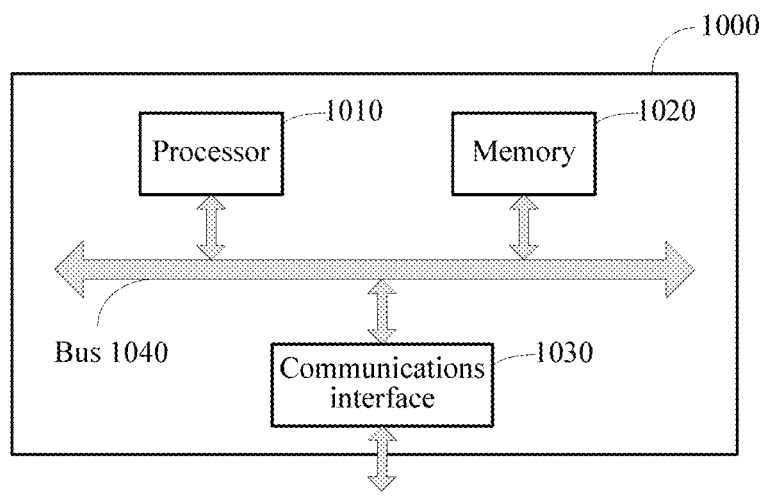
FIG. 10 is a schematic structural diagram of another network controller according to an embodiment of the present invention.
Figure 11:
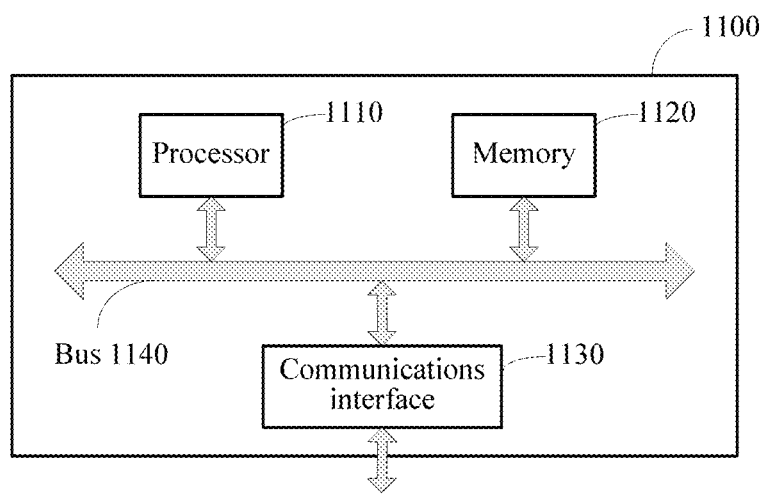
FIG. 11 is a schematic structural diagram of another user equipment according to an embodiment of the present invention.

An embodiment of the present invention further provides another network controller 1000 and another first UE 1100. FIG. 10 is a schematic structural diagram of the another network controller 1000. FIG. 11 is a schematic structural diagram of the another first UE 1100.

As shown in FIG. 10, the network controller 1000 includes a processor 1010, a memory 1020, a communications interface 1030, and a bus 1040. The memory 1020 stores an execution instruction. When the device runs, the processor 1010 communicates with the memory 1020 by using the bus 1040. The processor 1010 receives and sends information by using the communications interface 1030, and performs, according to a computer instruction stored in the memory 1020, steps of the methods disclosed in the method embodiments provided in FIG. 1 to FIG. 7 in the embodiments of the present invention.

As shown in FIG. 11, the first UE 1100 includes a processor 1110, a memory 1120, a communications interface 1130, and a bus 1140. The memory 1120 stores an execution instruction. When the device runs, the processor 1110 communicates with the memory 1120 by using the bus 1140. The processor 1110 receives and sends information by using the communications interface 1130, and performs, according to a computer instruction stored in the memory 1120, steps of the methods disclosed in the method embodiments provided in FIG. 1 to FIG. 7 in the embodiments of the present invention.

According to the technical solution provided in this embodiment of the present invention, a network controller configures at least one access network device for UE, so that the UE can simultaneously use multiple access network devices to implement data transmission or reception and can use two access network devices to respectively implement data transmission or reception and control signaling transmission or reception. In the technical solution in this embodiment of the present invention, a radio resource can be used appropriately and efficiently, and QoS of the UE is improved.

The processor in FIG. 10 or FIG. 11 may be a general purpose processor, a digital signal processor (DSP), an application-specific integrated circuit (ASIC), a field programmable gate array (FPGA) or another programmable logical device, a discrete gate or transistor logic device, or a discrete hardware component. The general purpose processor may be a microprocessor, or the processor may be any conventional processor or the like. Steps of the methods disclosed with reference to the embodiments of the present invention may be directly performed by a hardware decoding processor, or may be performed by using a combination of hardware and software modules in a decoding processor. The computer instruction may be located in a mature storage medium in the art such as a random access memory, a flash memory, a read-only memory, a programmable read-only memory, an electrically erasable programmable memory, or a register. The storage medium is located in the memory. The processor reads information in the memory, and performs the steps of the methods in the embodiments in combination with hardware of the processor.

A person of ordinary skill in the art may understand and implement all processes in the foregoing embodiments. All the processes can be implemented by using a computer program instruction in combination with relevant hardware.

In the solutions provided in the embodiments of the present invention, the "first", "second", "third", "fourth", and the like are merely intended to distinguish different objects, such as different access network devices and different UEs, but do not constitute any substantive limitation.

A limitation of application scenarios and the like in the foregoing embodiments is merely intended to describe a specific technical solution of the present invention, but not to limit the present invention. That is, modifications may be made to the technical solutions described in the foregoing embodiments, or equivalent replacements may be made to some technical features of the technical solutions. Such modifications and replacements shall fall within the protection scope of the present invention.

What is claimed is:

1. A method, comprising:
   receiving, by a network controller, a first message sent by a first user equipment using a first access network device of a plurality of access network devices, wherein the first message requests the network controller to configure another access network device of the plurality of access network devices for the first user equipment, to implement data transmission or reception between the first user equipment and the another access network device, wherein the first message is based on broadcast information broadcasted by the first access network device, access capability information of the first user equipment, and a determination to access the first access network device, wherein the broadcast information comprises connection information of a second access network device of the plurality of access network devices, wherein the connection information indicates a second communications standard supported by the second access network device, wherein a communications network comprises the network controller, the first user equipment, and the plurality of access network devices, and the plurality of access network devices comprise the first access network device supporting a first communications standard and the second access network device supporting the second communications standard;

configuring, in response to receiving the first message, by the network controller, the second access network device for the first user equipment, wherein the first access network device implements control signaling transmission or reception with the first user equipment; and sending, by the network controller using the first access network device to the first user equipment, a second message, wherein the second message indicates that the another access network device, which was configured by the network controller in response to receiving the first message, comprises the second access network device, wherein the first access network device implements control signaling transmission or reception with the first user equipment.

2. The method according to claim 1, wherein:

the first message comprises the access capability information of the first user equipment; and configuring the second access network device comprises configuring, according to the access capability information, the second access network device for the first user equipment, to implement data transmission or reception between the first user equipment and the second access network device.

3. The method according to claim 1, wherein requesting the network controller to configure the another access network device for the first user equipment, to implement the data transmission or reception between the first user equipment and the another access network device comprises:

requesting the network controller to configure, for the first user equipment, a user plane protocol stack corresponding to the another access network device.

4. The method according to claim 1, wherein the communications network further comprises a second user equipment and a fourth access network device of the plurality of access network devices, the fourth access network device implementing data transmission or reception with the second user equipment, wherein the first user equipment transmits data to the second user equipment, and the method further comprises:

receiving, by the network controller, the data sent by the first user equipment using one access network device of the plurality of access network devices that implements data transmission or reception with the first user equipment; and sending, by the network controller, the data to the second user equipment using the fourth access network device.

5. The method according to claim 1, wherein the communications network further comprises a third user equipment and a fifth access network device of the plurality of access network devices that implements data transmission or reception with the third user equipment, the first user equipment performs Wireless Fidelity peer-to-peer (Wi-Fi P2P) communication with the third user equipment, and the method further comprises:

receiving, by the network controller, a third message sent by the first user equipment using one access network device of the plurality of access network devices that implements data transmission or reception with the first user equipment, wherein the third message requests to perform Wi-Fi P2P communication with the third user equipment; and configuring, by the network controller, a channel resource for the first user equipment and the third user equipment according to the third message, to implement Wi-Fi P2P communication between the first user equipment and the third user equipment.

6. A device, comprising:

a processor; and a non-transitory computer-readable storage medium coupled to the processor and storing programming instructions for execution by the processor, the programming instructions instructing the processor to:

receive a first message sent by a first user equipment using a first access network device of a plurality of access network devices, wherein the first message requests the device to configure another access network device of the plurality of access network devices for the first user equipment, to implement data transmission or reception between the first user equipment and the another access network device, wherein the first message is based on broadcast information broadcasted by the first access network device and access capability information of the first user equipment, and a determination to access the first access network device, wherein the broadcast information comprises connection information of a second access network device of the plurality of access network devices, wherein the connection information indicates a second communications standard supported by the second access network device, wherein a communications network comprises the device, the first user equipment, and the plurality of access network devices, and the plurality of access network devices comprises the first access network device supporting a first communications standard and the second access network device supporting the second communications standard;

configure, in response to receiving the first message, the second access network device for the first user equipment, wherein the first access network device implements control signaling transmission or reception with the first user equipment; and send, using the first access network device to the first user equipment, a second message, wherein the second message indicates that the another access network device, which was configured by the device in response to receiving the first message, comprises the second access network device, wherein the first access network device implements control signaling transmission or reception with the first user equipment.

7. The device according to claim 6, wherein the first message comprises the access capability information of the first user equipment, and configuring the second access network device for the first user equipment comprises configuring the second access network device for the first user equipment according to the access capability information, to implement data transmission or reception between the first user equipment and the second access network device.

8. The device according to claim 6, wherein requesting the device to configure the another access network device for the first user equipment, to implement the data transmission or reception between the first user equipment and the another access network device comprises requesting a network controller to configure, for the first user equipment, a user plane protocol stack corresponding to the another access network device.

9. The device according claim 6, wherein the communications network further comprises a second user equipment and a fourth access network device of the plurality of access network devices that implements data transmission or reception with the second user equipment, and the first user equipment transmits data to the second user equipment, the programming instructions further instruct the processor to:
- receive the data sent by the first user equipment using one access network device of the plurality of access network devices that implements data transmission or reception with the first user equipment; and
- send the data to the second user equipment using the fourth access network device.

10. The device according to claim 6, wherein the communications network further comprises a third user equipment and a fifth access network device of the plurality of access network devices that implements data transmission or reception with the third user equipment, the first user equipment performs Wireless Fidelity peer-to-peer (Wi-Fi P2P) communication with the third user equipment, the programming instructions further instruct the processor to:
- receive a third message sent by the first user equipment using one access network device of the plurality of access network devices that implements data transmission or reception with the first user equipment; and
- configure a channel resource for the first user equipment and the third user equipment according to the third message, to implement Wi-Fi P2P communication between the first user equipment and the third user equipment.

11. A method, comprising:
- receiving, by a first user equipment, broadcast information broadcasted by a first access network device of a plurality of access network devices, wherein the broadcast information comprises connection information of a second access network device of the plurality of access network devices, wherein the plurality of access network devices comprises the first access network device supporting a first communications standard and the second access network device supporting a second communications standard, and wherein the connection information indicates the second communications standard supported by the second access network device;
- determining, by the first user equipment, based on the broadcast information and access capability information of the first user equipment, to access the first access network device;
- sending, by the first user equipment, based on determining to access the first access network device, a first message to a network controller using the first access network device, wherein the first message causes the network controller to configure another access network device of the plurality of access network devices for the first user equipment, to implement data transmission or reception between the first user equipment and the another access network device, wherein a communications network comprises the network controller, the first user equipment, and the plurality of access network devices; and
- receiving, by the first user equipment, a second message sent by the network controller using the first access network device, wherein the second message indicates that the another access network device, which was configured by the network controller in response to receiving the first message, comprises the second access network device, wherein the first access network device implements control signaling transmission or reception with the first user equipment.

12. The method according to claim 11, wherein:
the first message comprises the access capability information of the first user equipment; and
sending the first message to the network controller further causes the network controller to configure the second access network device for the first user equipment according to the access capability information.

13. The method according to claim 11, wherein requesting the network controller to configure the another access network device for the first user equipment, to implement the data transmission or reception between the first user equipment and the another access network device comprises:
- requesting the network controller to configure, for the first user equipment, a user plane protocol stack corresponding to the another access network device.

14. The method according to claim 11, wherein the communications network further comprises a second user equipment and a fourth access network device of the plurality of access network devices that implements data transmission or reception with the second user equipment, the first user equipment transmits data to the second user equipment, and the method further comprises:
- sending, by the first user equipment, the data to the network controller using one access network device of the plurality of access network devices that implements data transmission or reception with the first user equipment, so that the network controller sends the data to the second user equipment using the fourth access network device.

15. The method according to claim 11, wherein the communications network further comprises a third user equipment and a fifth access network device that implements data transmission or reception with the third user equipment, the first user equipment performs Wireless Fidelity peer-to-peer Wi-Fi P2P communication with the third user equipment, and the method further comprises:
- sending, by the first user equipment, a third message to the network controller using one access network device of the plurality of access network devices that implements data transmission or reception with the first user equipment, wherein the third message requests to perform Wi-Fi P2P communication with the third user equipment; and
- receiving, by the first user equipment, a fourth message sent by the network controller by using the first access network device that implements data transmission or reception with the first user equipment, wherein the fourth message indicates a channel resource configured by the network controller for the first user equipment and the third user equipment.

16. A device, comprising:
a processor; and
a non-transitory computer-readable storage medium coupled to the processor and storing programming instructions for execution by the processor, the programming instructions instruct the processor to:
- receive broadcast information broadcasted by a first access network device of a plurality of access network devices, wherein the broadcast information comprises connection information of a second access network device of the plurality of access network devices, wherein the plurality of access network devices comprise the first access network device supporting a first communications standard and the second access network device supporting a second communications standard, and wherein the connection information indicates the second communications standard supported by the second access network device;

determine, based on the broadcast information and access capability information of the device, to access the first access network device;

send, based on determining to access the first access network device, a first message to a network controller using the first access network device, wherein the first message causes the network controller to configure another access network device of the plurality of access network devices for the device, to implement data transmission or reception between the device and the another access network device, wherein a communications network comprises the network controller, the device, and the plurality of access network devices; and receive a second message sent by the network controller using the first access network device, wherein the second message indicates that the another access network device, which was configured by the network controller in response to receiving the first message, comprises the second access network device, wherein the first access network device implements control signaling transmission or reception with the device.

17. The device according to claim 16, wherein the first message comprises the access capability information of the device.

18. The device according to claim 16, wherein requesting the network controller to configure the another access network device for the device, to implement the data transmission or reception between the device and the another access network device comprises:

requesting the network controller to configure, for the device, a user plane protocol stack corresponding to the another access network device.

19. The device according to claim 16, wherein the communications network further comprises a second user equipment and a fourth access network device that implements data transmission or reception with the second user equipment, and the device transmits data to the second user equipment, and the programming instructions further instruct the processor to:

send the data to the network controller by using one access network device of the plurality of access network devices that implements data transmission or reception with the device, causing the network controller to send the data to the second user equipment by using the fourth access network device.

20. The device according to claim 16, wherein the communications network further comprises a third user equipment and a fifth access network device that implements data transmission or reception with the third user equipment, and the device performs Wireless Fidelity peer-to-peer (Wi-Fi P2P) communication with the third user equipment, and the programming instructions further instruct the processor to:

send a third message to the network controller by using one access network device of the plurality of access network devices that implements data transmission or reception with the device, wherein the third message requests to perform Wi-Fi P2P communication with the third user equipment; and receive a fourth message sent by the network controller using the second access network device that implements data transmission or reception with the device, wherein the fourth message indicates a channel resource configured by the network controller for the device and the third user equipment.

* * * * *